US010715330B1

(12) United States Patent
Govekar et al.

(10) Patent No.: US 10,715,330 B1
(45) Date of Patent: Jul. 14, 2020

(54) CRYPTOLOGIC BLOCKCHAIN-BASED CUSTODY AND AUTHORIZATION TRACKING FOR PHYSICAL CONCESSIONS

(71) Applicant: Accenture Global Solutions Limited, Dublin (IE)

(72) Inventors: Vivek Govekar, Chicago (IL); Mark Potts, Cherry Hills Village, CO (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/392,031

(22) Filed: Apr. 23, 2019

(51) Int. Cl.
*H04L 9/32* (2006.01)
*H04L 9/08* (2006.01)

(52) U.S. Cl.
CPC ............ *H04L 9/3236* (2013.01); *H04L 9/088* (2013.01); *H04L 9/0894* (2013.01); *H04L 2209/38* (2013.01)

(58) Field of Classification Search
CPC .................................................... H04L 9/3236
USPC ......................................................... 713/193
See application file for complete search history.

(56) References Cited

U.S. PATENT DOCUMENTS

| 2002/0138735 | A1* | 9/2002 | Felt ....................... H04L 63/126 713/176 |
| 2018/0253805 | A1* | 9/2018 | Kelly .................... G06Q 20/204 |
| 2019/0172012 | A1* | 6/2019 | Roy ..................... G06Q 10/0875 |

FOREIGN PATENT DOCUMENTS

CN          108416668 A    *  8/2018

* cited by examiner

*Primary Examiner* — Jacob Lipman
(74) *Attorney, Agent, or Firm* — Brinks Gilson & Lione

(57) ABSTRACT

A system supports authorization and custody tracking for physical concessions. In some cases, a physical concession or other physical object may be tracked to ensure that custodians that gain possession of the physical concession have proper authorization. Further, custody tracking may ensure that a particular custodian is issued the authorized amount of physical concession(s). Authorization circuitry may, via a peer network, access proof of authorization and custody status stored on a blockchain. Based on the proof of authorization and custody status, the authorization circuitry may determine whether issuance of the physical concession to a receiving custodian is allowed. After allowing/disallowing issuance of the physical concession, tracking circuitry may send, via the peer network, a request to update the blockchain.

20 Claims, 5 Drawing Sheets

CRYPTOLOGIC BLOCKCHAIN-BASED CUSTODY AND AUTHORIZATION TRACKING FOR PHYSICAL CONCESSIONS

TECHNICAL FIELD

This disclosure relates to blockchain-based custody and authorization tracking for physical concessions.

BACKGROUND

Rapid advances in electronics and communication technologies, driven by immense customer demand, have resulted in newly emerging complex network transaction chains. Improvements in the hardware and software implementations of the underlying processing and tracking features for the transaction chains will increase the security, reliability, and speed of the implementations.

DETAILED DESCRIPTION

Figure 1:
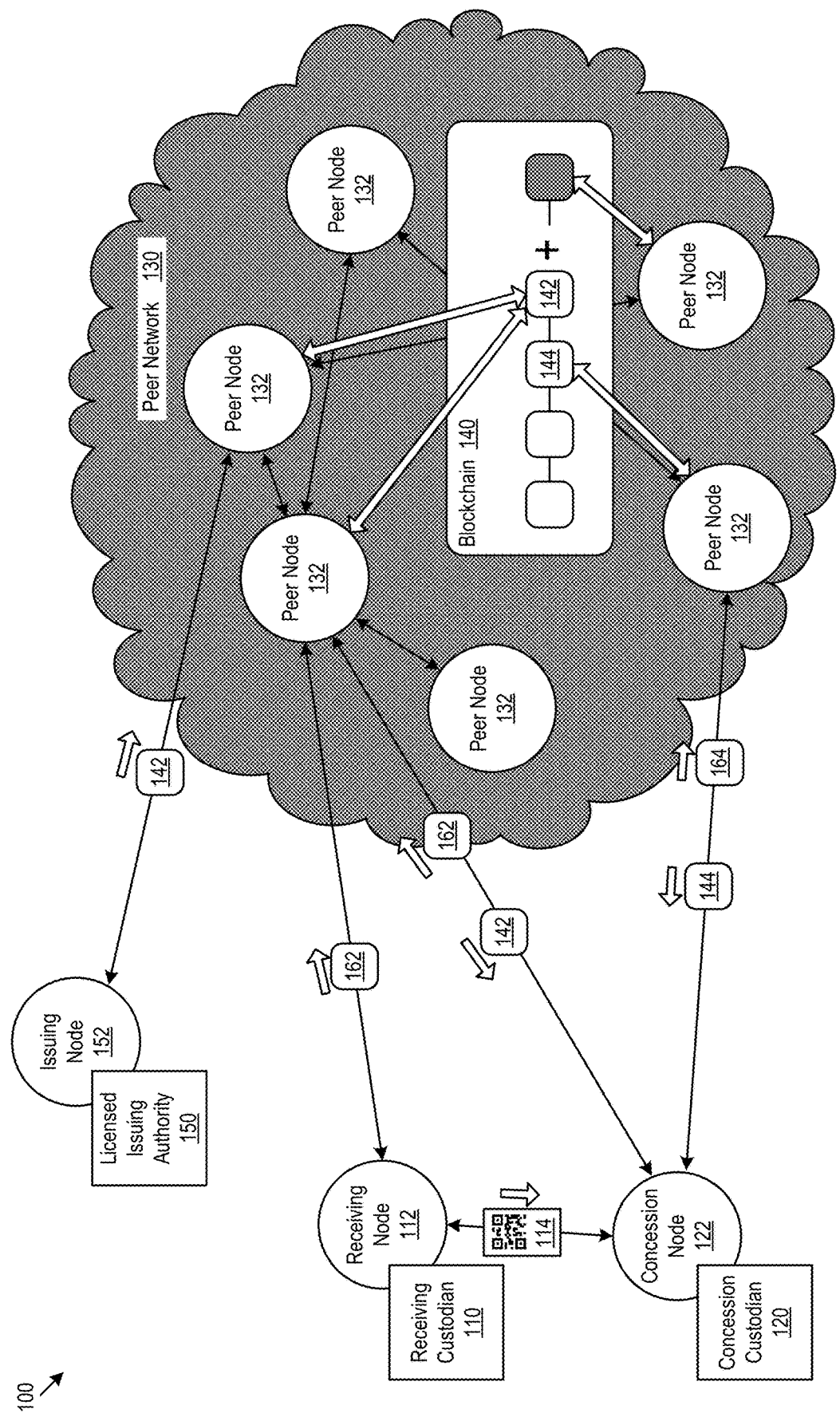
FIG. 1 shows an example tracking environment.

In some cases, physical concessions (e.g. physical items controlled or dispensed at one or more designated locations) may require custody authorization tracking. For example, controlled substances, state/private intelligence documents, private health records, firearms, forensic evidence, or other items with limited custodial authorization may be tracked as physical concessions. For example, when a physical concession is passed from the custody of a concession custodian to a receiving custodian a record of this physical exchange may be created for tracking purposes. Further, a record of the receiving custodian's authorization to obtain the physical concession may be created. This authorization record may allow the concession custodian to check whether the receiving custodian is authorized before issuing the physical concession to the receiving custodian. A custodian (e.g., receiving or concession) may refer to any entity capable of obtaining physical possession and/or legal control of a physical concession. In some cases, tracking custody and authorization may be achieved via blockchain-based (or other distributed-ledger technology based) transactions (e.g., events, records, entries, or other inputs). In some cases, use of a distributed technology, such as blockchain or cloud storage, for tracking of custody and authorization may allow various distinct entities (e.g., stakeholders with an interest in the custody of the physical concession) to access the custody and authorization information without necessarily relying on other stakeholders to provide such information directly. Rather, the interested entity may access the information directly form the distributed technology. Further, because the stakeholders access the information from the same source, the stakeholders can be confident that such information is up-to-date. A distributed technology may refer to technologies where access and/or storage may be distributed across a peer network of peer nodes and where individual nodes may exchange data without, in some cases, a central authority. However, in some cases, a peer network may utilize a central authority for peer verification or a central repository for some data storage tasks.

In some cases, nodes performing peer functions may also host client functions for stakeholder transactions. However, in some cases, peer nodes may not necessarily host any client functions for stakeholder transactions. Further, in some cases, nodes hosting client functions for stakeholder transactions may not necessarily perform any peer functions.

In some cases, distributed technologies other than ledger and/or blockchain-based technologies, such as unsecured cloud storage may allow changes to be made to existing data without necessarily providing a record of such changes. Accordingly, entities may have reduced confidence in the integrity of the information. In some cases, secure tracking information may benefit from the added security of immutability (or specific, secure, and limited mutability by trusted parties) because such immutability stakeholders may have increased confidence that the stored custody and authorization information is complete, accurate, tamper-free, and up-to-date. In some cases, functional immutability may be provided by hash or other cryptologic-primitive based technologies such as blockchain or other distributed ledger technologies, referred to collectively as "blockchain" for convenience and clarity. "Cryptologic" may be used to describe any technology or algorithm based on encryption, obfuscation, hashing, or other cipher-based system.

In some cases, a physical concession may include a unique or controlled quantity item (e.g., an intelligence document, forensic evidence, a quantity of a controlled substance, or other items). Thus, in some cases, a system may individually track the unique item or specific quantity/instance of the item. In some implementations, a unique or otherwise specific machine-cognizable (e.g., a barcode, a QR (Quick Response) code, an image, a two-dimensional symbol array, or other code capable of identifying information or transferring information from machine-to-machine) may be generated by the system to facilitate such individualized tracking. The machine-cognizable code may be scanned in coordination with changes to the custody status of the physical concession. In some cases, the machine-cognizable code may be used to convey identifiers (e.g., for the physical concession and/or receiving custodian), keys for decryption, or other information to facilitate tracking. In some cases, the machine-cognizable code (or another associated, code, symbol, pattern, number or other representation) may be imprinted on the physical concession to facilitate verification that the proper instance is in the possession of the receiving custodian.

In various implementations, the precise custody and authorization of particular physical concessions may itself be sensitive. Provision of such information on a public blockchain or to the full membership of private distributed technology may result in an unacceptably wide dissemination of the information. For example, in the case of confidential intelligence documents of state or non-governmental organizations, it may be undesirable to disclose the whereabouts of such documents or even the identities of the entities authorized to access such information. In the case of controlled substances, such information may be private under medical records regulations and statutes such as the Health Insurance Portability and Accountability Act of 1996 (HIPAA). Accordingly, in some cases, sensitive custody and/or authorization information may be stored on the distributed technology in an encrypted or other otherwise obfuscated state.

In various implementations, where data integrity and viewing control are prioritized, a peer-network-based blockchain utilizing encrypted or otherwise obfuscated (for example, hashed) data-storage and machine-cognizable codes to ensure that data is secure, up-to-date, and unauthorized-tamper-free and that the correct physical concession is being tracked. Accordingly, a peer-network-based blockchain using machine-cognizable codes that may, in some cases, implement encrypted storage provides increase in data security and integrity and tracking accuracy relative to systems lacking such features. Accordingly, such a peer-network-based blockchain using machine-cognizable codes tracking custody and authorization for a physical concession provides a technical solution that provides an improvement to the underlying operation (e.g., the security and integrity) of the hardware, thereby solving a technical problem. Further, the improved security and integrity for custody and authorization tracking provides a practical improvement over existing market-based solutions.

FIG. 1 shows an example tracking environment 100. In the example tracking environment 100, a receiving custodian 110 may present a receiving node 112 displaying a machine-cognizable code 114. A concession node 122, operated by a concession custodian 120, may scan the machine-cognizable code 114. Based on information identified via and/or extracted from the machine-cognizable code 114, the concession node may access proof of authorization 142 for the receiving custodian and/or custody status 144 for the physical concession via a peer network 130 hosting a blockchain 140. The peer nodes 132 exchange data to temporally order multiple transactions stored within the blockchain to achieve consensus when appending blocks to the blockchain. In some implementations, the receiving node 112 and/or the concession node 122 may operate as peer nodes within the peer network 130. In some implementations, the receiving and/or concession nodes may operate outside the peer network 130.

The proof of authorization 142 may be provided to the peer network from a licensed issuing authority 150. For example, a issuing node 152 operated on behalf of a medical professional (e.g., a doctor, a nurse practitioner, a physician's assistant, or other prescribing professional) may issue a prescription providing authorization for a patient to receive a prescribed amount of a controlled substance (e.g., a prescription drug). In another example, a licensed issuing authority may be an executive agency (e.g., Federal Bureau of Investigation—FBI, Central Intelligence Agency—CIA) providing access to physical intelligence documents. In various implementations a licensed issuing authority may be an entity designated as having specific license (e.g., state provided authority, non-governmental organization provided authority, authority assigned by the peer network, or other authority provide by stakeholders) to issue authorization for custody of the relevant physical concessions. In some cases, the proof of authorization may be provided to the peer network directly by an issuing node 152; indirectly (but digitally signed using a private key associated with the licensed issuing authority 150), indirectly via capture of an image (e.g., such as an image of prescription or security certification) at the concession node 122 and/or the receiving node 112; or via other verifiable provision. In some cases, the private key may be assigned to the licensed issuing authority (e.g., on their own authority, by the peer network, or through another key assignment scheme).

Figure 2:
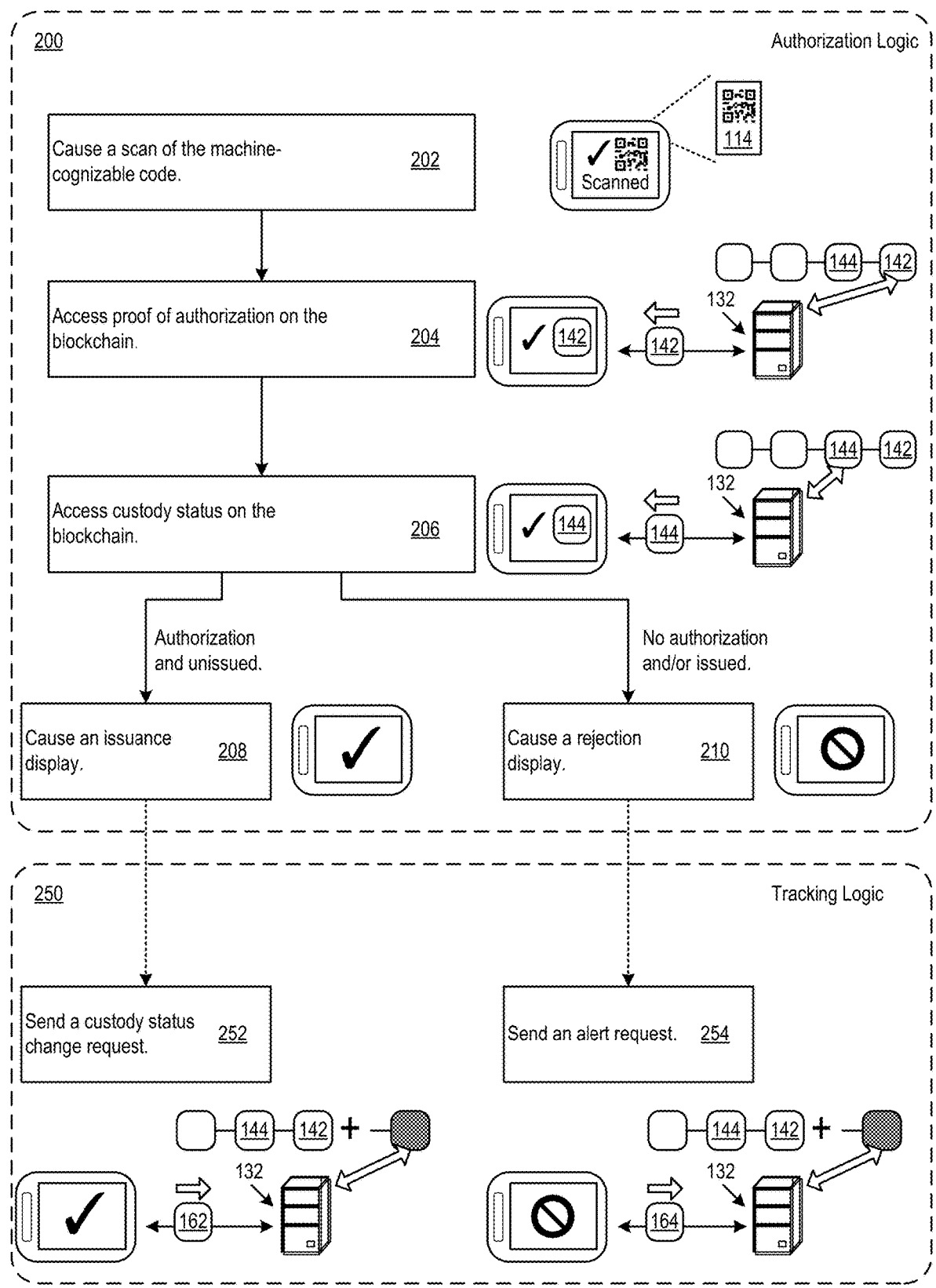
FIG. 2 shows example authorization logic and example tracking logic.

Referring to FIG. 1 and, also to FIG. 2, FIG. 2 shows example authorization logic 200 and example tracking logic 250, which may be implemented on circuitry (e.g., authorization/tracking circuitry). The authorization logic 200 (e.g., operating on authorization circuitry on a concession node 122) may obtain an identifier for the physical concession by the causing a scan of a machine-cognizable code 114 (202). In some cases, the receiving custodian may obtain authorization from a licensed issuing authority that provides the authorization to the peer network (e.g., without further action by the receiving custodian or the concession custodian). The receiving node may pre-generate (or obtain from the peer network) the machine-cognizable code prior to presentation to the authorization logic 200. In some cases, the receiving node 112 may generate/obtain the machine-cognizable code after initial interactions with the concession custodian establishing the proof of authorization.

In some cases, the machine-cognizable code may not necessarily be generated until authorization in a non-machine cognizable (or not readily machine-cognizable) form or via a logically/physically isolated electronic provision system to the concession custodian 120 is performed. As an illustrative example scenario, the authorization may be in the form of a physical prescription slip presented to the concession custodian (e.g., a pharmacy) and then verified by the pharmacy. In another example scenario, the concession custodian may receive authorization from the licensed issuing authority in an electronic form. In the illustrative scenario above this may be similar to an electronic prescription transmission from a doctor's office. In some cases, existing electronic prescription transmission systems may be physically/logically isolated from implemented forms of the architecture discussed herein. The pharmacy may then forward this electronic prescription to the peer network to effectively integrate the systems. The concession custodian 120 may then provide the proof of authorization to the peer network in place of direct provision by the licensed issuing authority 150. Once these initial interactions establish the proof of authorization on the blockchain, the receiving node 112 may generate/obtain the machine-cognizable code 114 for scanning by the concession node 122.

Once the identifier is obtained, the authorization logic 200 may access the proof of authorization on the blockchain (204). The authorization logic 200 may access the blockchain via the peer network. This communication between the authorization logic 200 and the peer network may be facilitated by network interface circuitry (which may be implemented as the communication interfaces 312, 412, 512, as discussed below).

When the proof of authorization is present on the blockchain, this proof of authorization entitles the receiving custodian to possession of a unique physical concession or one or more specific instances of a non-unique physical concession. This may help establish that the receiving custodian may not necessarily be violating rules by being in possession of the physical concession. For example, police finding a receiving custodian in possession of a controlled substance could check, via the peer network, that the receiving custodian has proof of authorization for the controlled substance. However, the existence of the proof of authorization alone may not necessarily be sufficient to support issuance of a physical concession to the receiving custodian. Rather, the concession custodian 120 may further verify that the receiving custodian has not already received the physical concession.

In some implementations, a proof of authorization may, in some cases, entitle a receiving custodian 110 to multiple physical concessions. For example, in the case of controlled substances, a prescription may authorize multiple refills or multiple units of the controlled substance. In the context of intelligence documents, a proof of authorization may entitle the receiving custodian to multiple different documents. Thus, the multiple physical concessions may include multiple distinct items or multiple instances of the same inventory item. Further, the multiple physical concession may, in some cases, be delivered over multiple issuances. In some cases, the proof of authorization may define a schedule (e.g., scheduling parameters) by which the multiple issuances may occur. In some cases, a different specific machine-cognizable code may be generated for each distinct item/issuance. In some cases, a single machine-cognizable code may cover multiple distinct items/issuances.

To determine whether the physical concession was previously issued, the authorization logic 200 may access the custody status 144 stored on the blockchain (206). The custody status 144 may include one or more transactions (for example, a series of transactions) tracking the custody exchanges leading to the current recorded possession of the physical concession. In an illustrated example scenario for a controlled substance, a first exchange tracking a surrender of the controlled substance from the manufacturer to a distributor may be recorded as a transaction on the blockchain. This transaction may be followed by a transaction between the distributor and the pharmacy resulting in the pharmacy's possession. Another transaction may show that the controlled substance was issued to the receiving custodian.

The custody status may establish that the controlled substance was not previously issued.

In some cases, custody status 144 may include a binary issued/unissued status for the receiving custodian, which may not necessarily reflect/include multiple transactions. In some cases, this binary custody status may reference the proof of authorization to relate the two data items (e.g., for ease of location within the blockchain).

When the receiving custodian has proof of authorization 142 and the custody status 144 indicates that the physical concession has not yet been issued, the authorization logic 200 may cause an issuance display (208). The issuance display may confirm that issuance of the physical concession is allowed.

In various implementations, the issuance display may include further information and/or alerts. For example, the issuance display may include an image of the receiving custodian and/or biometric data to facilitate proper identification of the receiving custodian. In some cases, the issuance display may include information regarding the physical concession such as quantities, safety warnings, handling guidelines, or other data. Further, warnings related to other physical concessions previously issued to the receiving custodian. An illustrative example scenario may include harmful prescription drug interaction warnings. In the illustrative scenario, such warnings may be coordinated across multiple different (and, in some cases, otherwise unassociated) pharmacies since prescription information may be accessed by different concession custodians using the same blockchain.

When the receiving custodian does not have proof of authorization 142 or the custody status 144 indicates that the physical concession has previously been issued, the authorization logic 200 may cause a rejection display (210). The rejection display may confirm for the concession custodian that issuance of the physical concession (or an additional instance thereof) is disallowed.

In some implementations, the rejection display may include further recommended actions such as alerting authorities, such as the licensed issuing authority or other authorities, of the rejection. In some cases, the nature of such recommended additional action may change depending on the number of the rejections and/or frequency of the rejections that a particular receiving custodian has previously been issued. In some cases, rejections related to multiple different physical concessions may be considered when recommending additional actions.

After the relevant display has been created, the tracking logic 250 (e.g., operating on tracking circuitry on a concession node 122 or a receiving node 112) may send (e.g., via networking interface circuitry) one or more requests for blockchain updates to the peer network.

When an issuance display is created, the tracking logic 250 may send a custody change request 162 to update the custody status for the physical concession (252). For example, the tracking logic 250 may request that an additional transaction reflecting the issuance of the physical concession from the concession custodian to the receiving custodian be added to the blockchain. Additionally or alternatively, the tracking logic 250 may request that a binary issued/unissued custody status be updated from unissued to issued.

In some cases, tracking logic 250 operating on the concession node 122 may operate in parallel with tracking logic 250 operating on the receiving node 112. For example, receiving and concession nodes may send redundant custody change requests 162 to the peer network to update the custody status on the blockchain. This may protect against reliance on a particular party to send such requests, which may reduce both inadvertent and surreptitious omissions.

In various implementations, the tracking logic 250 may attach a timestamp to the custody change request 162 (or any other request sent by the tracking logic 250). The timestamp may be used by the peer network in sequencing custody transactions. In some cases, the peer nodes may also attach timestamps when requests are received. However, latency in request delivery and/or batch sending may de-correlate the order in which requests are received by the peer nodes with the time sequence in which the events occurred. Accordingly, in achieving consensus the peer network may in some cases sequence transactions out-of-order with respect to timestamps attached when the corresponding requests were received by one or more peer nodes, but in order with respect to timestamps attached when the requests are generated.

In some implementations, when a rejection display is created, the tracking logic 250 may send an alert request 164 to include a record of the disallowed issuance on the blockchain (254). In some cases, including records of disallowances on the blockchain may assist in the tracking of illicit attempts to gain possession of physical concessions when such possession is unauthorized. This may help identify compromised identities, misuse of limited authorization, or other activities that may warrant a response from authorities and/or concession custodians.

In some cases, timestamps may be used to determine whether requests received at different peer nodes are actually multiple instances of the same request. In some cases, network partitions (e.g., interruption in network connectivity) may cause one or more peer nodes to be temporarily out-of-communication with one or more other peer nodes in the peer network. Accordingly, multiple instances of the same request may be redundantly received by different partitions of the peer network. These redundant receptions may, in some cases, be identified using the timestamps attached by the tracking logic 250. A reception timestamp, e.g., added by the receiving peer node 132, may be used when there is uncertainty with respect to when an event occurred. For example, a reception timestamp may be used to select between conflicting timestamps attached to redundant custody change requests.

In various implementations, as discussed above, it may be undesirable (or a violation) to share the details of the custody and proof of authorization tracking with the at least some of the stakeholders in the blockchain (e.g., one or more receiving custodians not involved in a given transaction, one or more other concession custodians not involved in a given transaction, one or more peer nodes, or other stakeholders). Accordingly, the transactions may be stored on the blockchain in an encrypted form to limit access to the details of any given transaction. For example, the nature, quantity, purpose, and/or specific identity of a physical concession may be masked using encryption. For example, the identity of the receiving and/or concession custodian may be masked allowing anonymous transactions. In some cases, digital signatures may be used in place of human-cognizable identities to allow pseudonymous transactions. In some cases, cryptologic primitives such as commitments may be used in place of other encryption. Commitments may keep specific details private but allow a stakeholder to verify information known to the stakeholder against the commitment. This may facilitate the identification of misrepresentations (intentional or unintentional) of the content of the encrypted data. For example, commitments may keep details private, but may also prevent putatively knowledgeable parties from lying about those details without risk that the misrepresentation can be identified.

Additionally or alternatively, permission controls may also be used to maintain privacy. For example, the peer nodes may control access to the blockchain content. The peer nodes may refuse access request from nodes lacking proper access permissions for the blockchain or specific content on the blockchain. In some cases, blockchain consensus rules may enforce privacy. For example, smart contracts or other executable code on the blockchain may prevent unauthorized viewing of blockchain content.

In an example scheme, stakeholders are assigned a digital identity. To access the blockchain, the peer nodes may require the stakeholders to provide credentials (e.g., certificates, logons, passcodes, or other security credentials) to establish their identity. The stakeholder may then be granted access to the blockchain in accord with the established identity.

Additionally or in another example scheme, the blockchain consensus mechanism may require access validation by the receiving custodian before a concession putative concession custodian may view blockchain content related to the receiving custodian. For example, when a concession custodian requests access to proof of authorization or custody status for a receiving custodian, a notification may be sent to the receiving custodian requesting a confirmation allowing the concession custodian to view the content. The concession custodian may refuse to issue the physical concession if the receiving custodian refuses access to the stored blockchain records. However, access verification may prevent concession custodians from attempting to view private information when such viewing is not actually attached to a physical concession request by a receiving custodian. The blockchain consensus mechanism may track these access verifications by adding records of confirmations sent by the receiving custodians added to the blockchain. In some cases, a smart contract may prevent the release of such information until a confirmation (e.g., a digitally signed confirmation) from the receiving custodian is provided as an input to the executable smart contract code.

Figure 3:
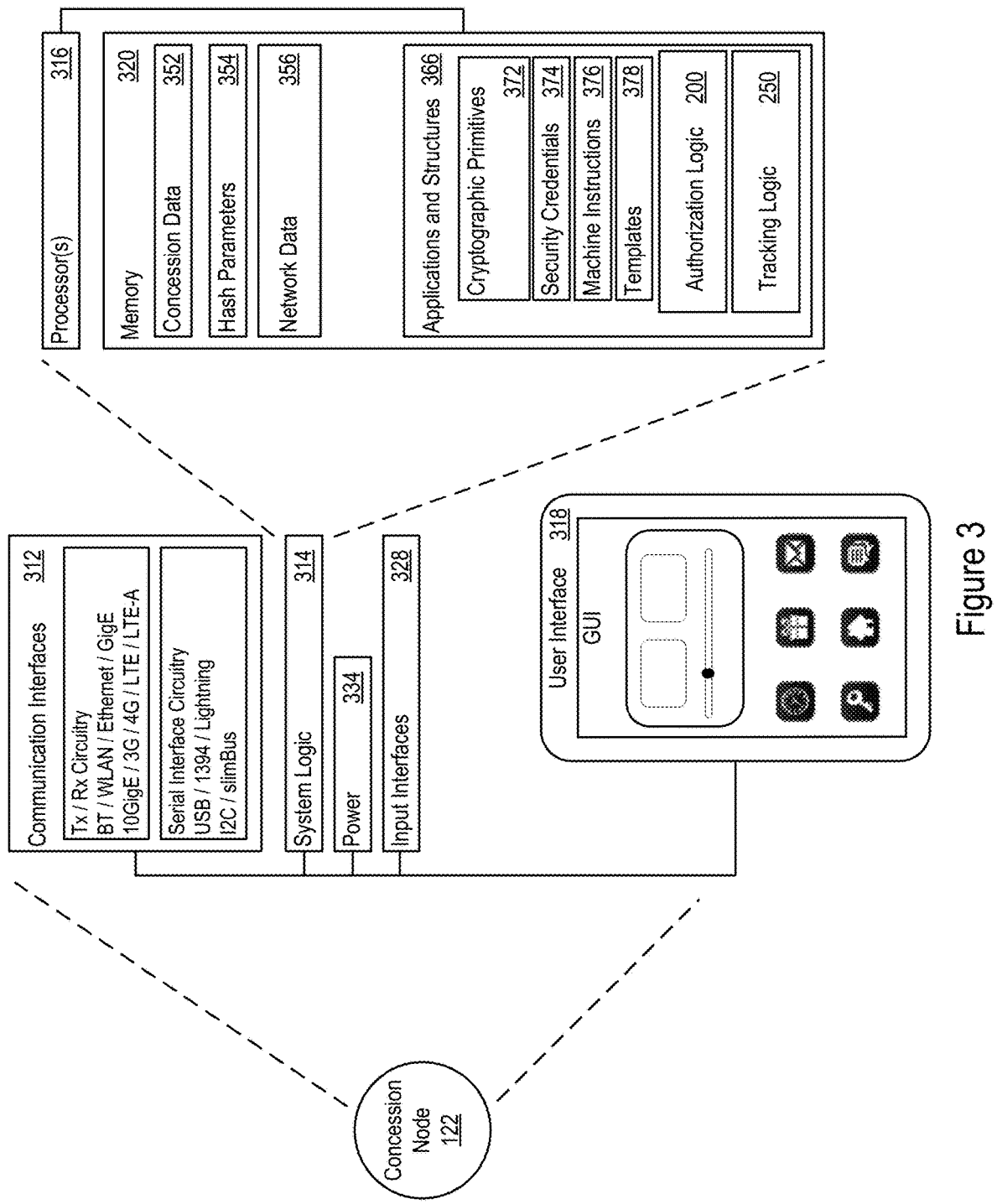
FIG. 3 shows an example concession node for the example tracking environment of FIG. 1.

FIG. 3 shows an example concession node 122. The concession node 122 may include system logic 314 to support execution of the authorization 200 and/or tracking 250 logic described above. The system logic 314 may include processors 316, memory 320, and/or other circuitry. In various implementations, the concession node 122 may act as (and/or incorporate) the authorization and/or tracking circuitries when specifically configured to implement authorization 200 and/or tracking 250 logic.

The memory 320 may include concession data 352, hash parameters 354, and network data 356 to custody tracking updates and authorization verification/capture. The memory 320 may further include applications and structures 366, for example, cryptographic primitives 372, security credentials 374, machine instructions 376, templates 378, or other structures to support machine-cognizable code scanning, blockchain access, peer network interactions, request generation, authorization document capture, or other tasks described above. The applications and structures may implement the authorization 200 and/or tracking 250 logic.

The concession node 122 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I$^2$C, slimBus, or other serial interfaces. The communication interfaces 312 may be used as network interface circuitry to support and/or implement peer network interactions, remote operation, peer network participation, blockchain access, request transfer, or other tasks. The concession node 122 may include power functions 334 and various input interfaces 328. The concession node 122 may also include a user interface 318 that may include human-to-machine interface devices and/or graphical user interfaces (GUI). The user interface 318 may be used to support and/or implement local or localized operation (noting that the blockchain network and/or the concession node 122 itself may be distributed) of the concession node 122. In various implementations, the concession node 122 implemented as the authorization 200 and/or tracking 250 circuitries may be distributed over one or more physical servers, be implemented as one or more virtual machines, be implemented in container environments such as Cloud Foundry or Docker, and/or be implemented in Serverless (functions as-a-Service) environments.

In some cases, the concession node 122 may be a specially defined computational system deployed in a cloud platform, with a localized control terminal. In some cases, the parameters defining the execution environment may be specified in a manifest for cloud deployment. The manifest may be used by an operator to requisition cloud based hardware resources, and then deploy the software components, for example, the applications and structures 366, of the concession node onto the hardware resources. In some cases, a manifest may be stored as a preference file such as a YAML (yet another mark-up language), JSON, or other preference file type.

Figure 4:
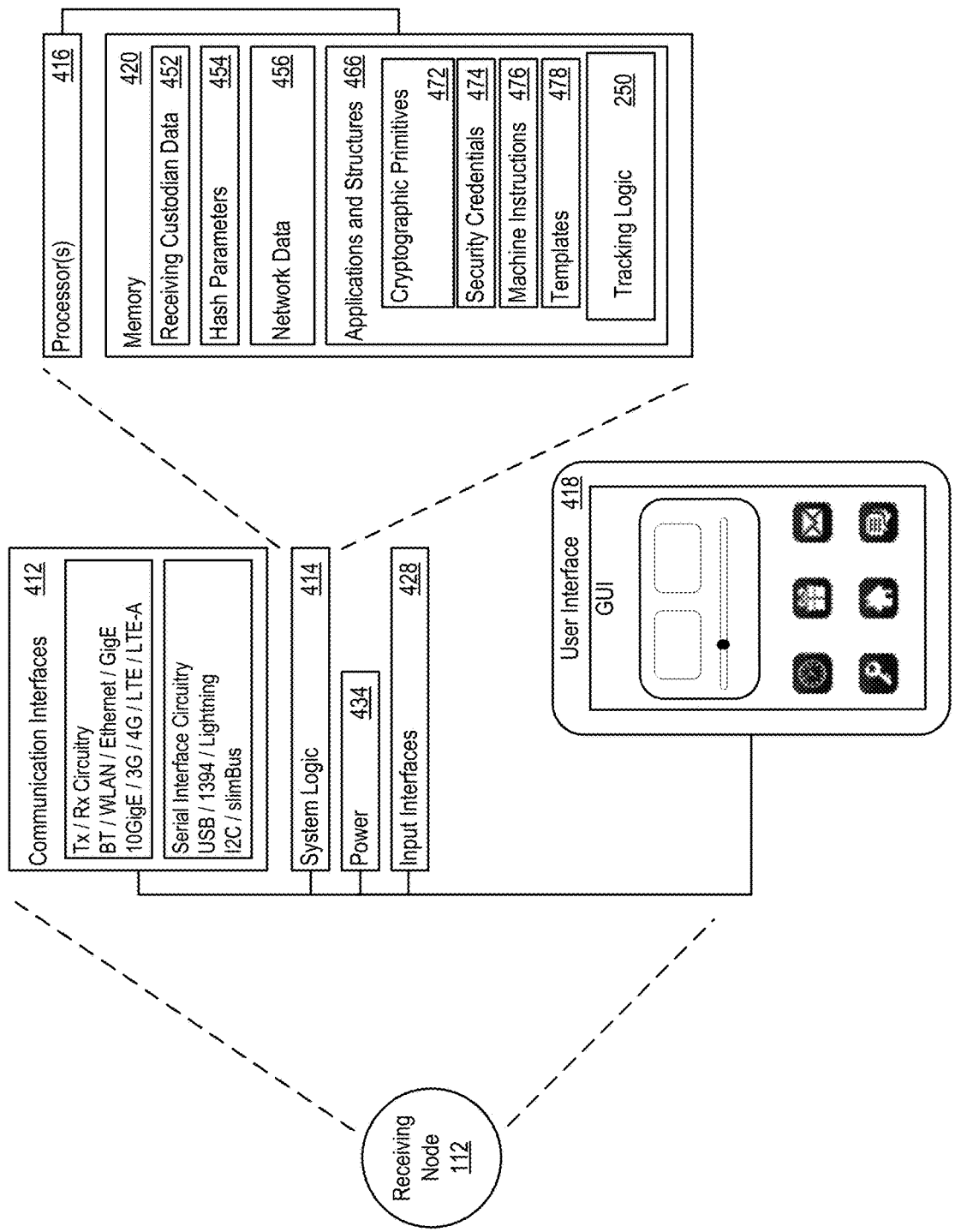
FIG. 4 shows an example receiving node for the example tracking environment of FIG. 1.

FIG. 4 shows an example receiving node 112. The receiving node 112 may include system logic 414 to support execution of various tasks described above. The system logic 414 may include processors 416, memory 420, and/or other circuitry. In various implementations, the receiving node 112 may act as (and/or incorporate) the authorization and/or tracking circuitries when specifically configured to obtain/generate the machine-cognizable code and/or execute tracking 250 logic.

The memory 420 may include receiving custodian data 452, hash parameters 454, and network data 456 to perform custody tracking updates and generate/obtain machine cognizable codes. The memory 420 may further include applications and structures 466, for example, cryptographic primitives 472, security credentials 474, machine instructions 476, templates 478, or other structures to support execution of various tasks described above. The applications and structures may be configured to obtain/generate the machine-cognizable code and/or execute tracking 250 logic.

The receiving node 112 may also include communication interfaces 412, which may support wireless, e.g. Bluetooth, Wi-Fi, WLAN, cellular (4G, LTE/A), and/or wired, Ethernet, Gigabit Ethernet, optical networking protocols. The communication interfaces 412 may also include serial interfaces, such as universal serial bus (USB), serial ATA, IEEE 1394, lighting port, $I^2C$, slimBus, or other serial interfaces. The communication interfaces 412 may be used as network interface circuitry to support and/or implement peer network interactions, remote operation, peer network participation, blockchain access, request transfer, or other tasks. The receiving node 112 may include power functions 434 and various input interfaces 428. The receiving node 112 may also include a user interface 418 that may include human-to-machine interface devices and/or graphical user interfaces (GUI). The user interface 418 may be used to support and/or implement local or localized operation (noting that the blockchain network and/or the receiving node 112 itself may be distributed at least in part) of the receiving node 112.

In an illustrative example, the receiving node 112 may include a mobile device with a touchscreen or other display, printer, or output device capable of displaying the machine cognizable code for scanning by the concession node.

Figure 5:
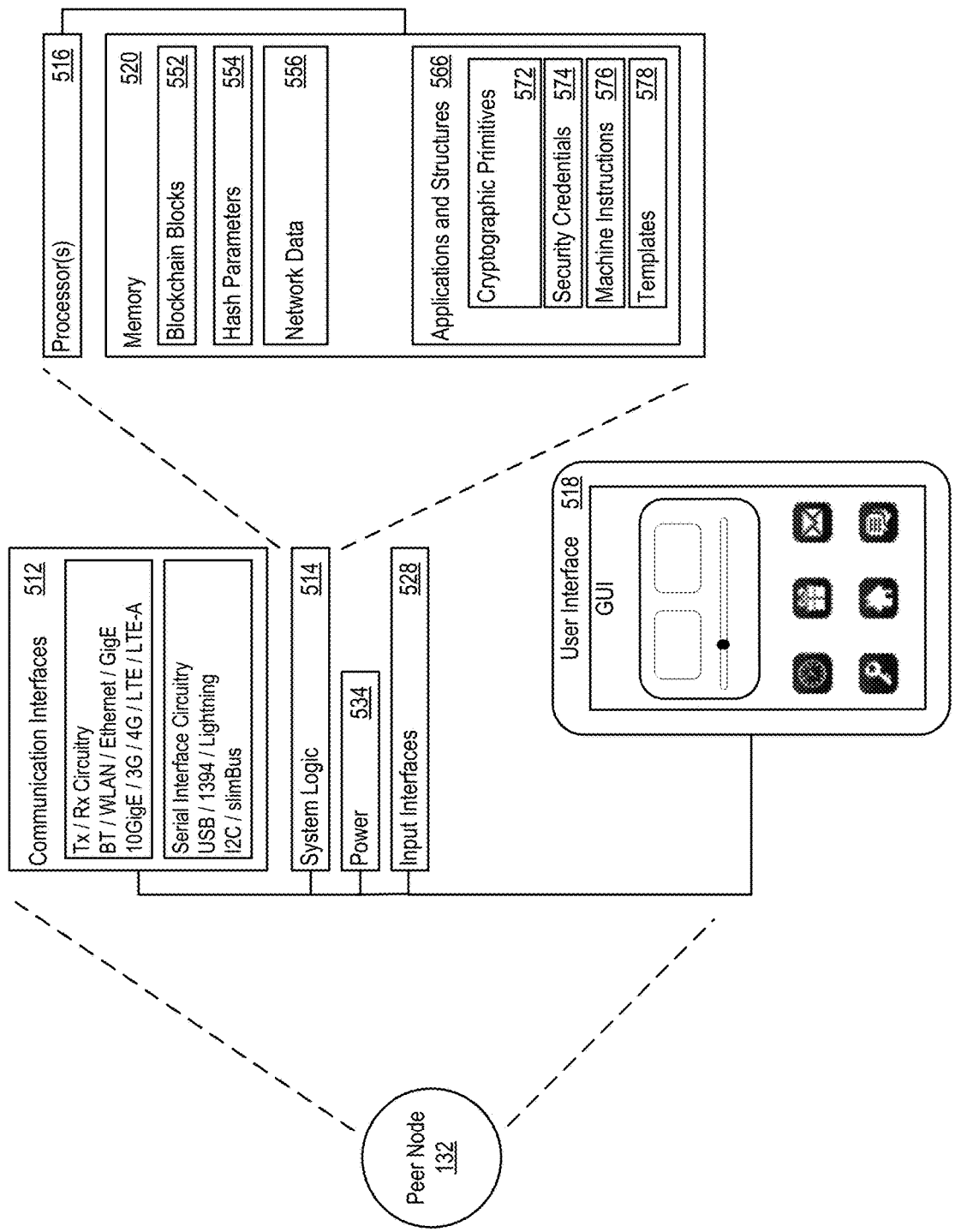
FIG. 5 shows an example peer node for the example tracking environment of FIG. 1.

FIG. 5 shows an example peer node 132. The example peer node 132 may include system logic 514 to support execution of the peer network operations described above. The system logic 514 may include processors 516, memory 520, and/or other circuitry.

The memory 520 may include blockchain blocks 552, hash parameters 554, and network data 556 to support blockchain manipulation and writing. The memory 520 may further include applications and structures 566, for example, cryptographic primitives 572, security credentials 574, machine instructions 576, templates 578, or other structures to support permission exchange, asset transfer, transfer notification, blockchain reads/writes or other tasks described above.

The example peer node 132 may also include communication interfaces 512, which may support wireless, e.g. Bluetooth, Wi-Fi, WLAN, cellular (4G, LTE/A), and/or wired, Ethernet, Gigabit Ethernet, optical networking protocols. The communication interfaces 512 may also include serial interfaces, such as universal serial bus (USB), serial ATA, IEEE 1394, lighting port, $I^2C$, slimBus, or other serial interfaces. The communication interfaces 512 may be used to support and/or implement permission exchanges, remote operation, blockchain network participation or other tasks. The example peer node 132 may include power functions 534 and various input interfaces 528. The example peer node 132 may also include a user interface 518 that may include human-to-machine interface devices and/or graphical user interfaces (GUI). The user interface 518 may be used to support and/or implement local or localized operation (noting that the blockchain network and/or the execution environment itself may be distributed) of the example peer node 132. In various implementations, the example peer node 132 may be distributed over one or more physical servers, be implemented as one or more virtual machines, be implemented in container environments such as Cloud Foundry or Docker, and/or be implemented in Serverless (functions as-a-Service) environments.

In some cases, the example peer node 132 may be a specially defined computational system deployed in a cloud platform. In some cases, the parameters defining the example peer node 132 may be specified in a manifest for cloud deployment. The manifest may be used by an operator to requisition cloud based hardware resources, and then deploy the software components, for example, the applications and structures 566, of the example peer node 132 onto the hardware resources. In some cases, a manifest may be stored as a preference file such as a YAML (yet another mark-up language), JSON, or other preference file type.

The methods, devices, processing, circuitry, and logic described above and in the specific illustrative examples below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, in hardware, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: access a blockchain via a peer network for the blockchain, the blockchain configured to: track: a custody status for a physical concession; and an authorization status for a receiving custodian of the physical concession; store a proof of authorization for the receiving custodian, the proof of authorization confirming an entitlement of the receiving custodian to obtain issue of the physical concession; and implement a consensus operating procedure by temporally ordering multiple status exchanges for the physical concession; authorization circuitry configured to: obtain an identifier for the physical concession via a scan of a machine-cognizable code presented on behalf of the receiving custodian; using the identifier and via the network interface circuitry, access the proof of authorization stored on the blockchain for the receiving custodian; and via the network interface circuitry, access the custody status for the physical concession; at a time that the custody status is unissued and the receiving custodian is authorized, cause an issuance display confirming issue of the physical concession to the receiving custodian is allowed; and at a time that the custody status is issued or the receiving custodian is unauthorized, cause an rejection display confirming issue to the receiving custodian is disallowed; and tracking circuitry configured to: responsive to causing the issuance display, send a custody change request to the peer network via the network interface circuitry, the custody change request configured to request, for addition to the blockchain, a record of a status exchange changing the custody status from unissued to issued.

A2 The system of example A1, the tracking circuitry is configured to, responsive to causing the rejection display, send an alert request to the peer network via the network interface circuitry, the alert request configured to request a record of a disallowed issuance on the blockchain.

A3 The system of either of examples A1 or A2, where the proof of authorization is received at the peer network from a licensed issuing authority.

A4 The system of example A3, where the proof of authorization is digitally signed using a private key assigned to the licensed issuing authority.

A5 The system of any of examples A1-A4, where the authorization circuitry is configured to: before obtaining the identifier, generate the proof of authorization based on a captured authorizing document provided by the receiving custodian; and after generating the proof of authorization, send, to the peer network, an authorization storage request to store the proof of authorization on the blockchain.

A6 The system of any of examples A1-A5, where the machine-cognizable code includes a barcode, a QR code, an image, a two-dimensional symbol array, or any combination thereof.

A7 The system of any of examples A1-A6, where the tracking circuitry is configured to attach a timestamp to the custody change request.

A8 The system of example A7, where the timestamp is configured to distinguish multiple separate custody change requests from multiple instances of a single change request originating from a partition within the peer network.

A9 The system of any of examples A1-A8, where the proof of authorization is stored within the blockchain in an encrypted form.

A10 The system of example A9, where the authorization circuitry is further configured to obtain a decryption key for the proof of authorization from the machine-cognizable code.

A11 The system of any of examples A1-A10, where the proof of authorization is configured to confirm entitlement of the receiving custodian to multiple physical concessions.

A12 The system of example A11, where the multiple physical concessions include multiple instances of the same inventory item.

A13 The system of example A12, where the proof of authorization defines a schedule by which issuances of the multiple instances of the same inventory item are allowed.

B1 In an example a method includes: at network interface circuitry: accessing a blockchain via a peer network for the blockchain, the blockchain configured to: track: a custody status for a physical concession; and an authorization status for a receiving custodian of the physical concession; store a proof of authorization for the receiving custodian, the proof of authorization confirming an entitlement of the receiving custodian to obtain issue of the physical concession; and implement a consensus operating procedure by temporally ordering multiple status exchanges for the physical concession; at authorization circuitry obtaining an identifier for the physical concession via a scan of a machine-cognizable code presented on behalf of the receiving custodian; using the identifier and via the network interface circuitry, accessing the proof of authorization stored on the blockchain for the receiving custodian; and via the network interface circuitry, accessing the custody status for the physical concession; and at a time that the custody status is unissued and the receiving custodian is authorized, causing an issuance display confirming issue of the physical concession to the receiving custodian is allowed; and at tracking circuitry: responsive to causing the issuance display, sending a custody change request to the peer network via the network interface circuitry, the custody change request configured to request, for addition to the blockchain, a record of a status exchange changing the custody status from unissued to issued.

B2 The method of example B1, further including, at a time that the custody status is issued or the receiving custodian is unauthorized, causing an rejection display confirming issue to the receiving custodian is disallowed.

B3 The method of either of examples B1 or B2, further including, at the tracking circuitry: attaching a timestamp to the custody change request, the timestamp configured to distinguish multiple separate custody change requests from multiple instances of a single change request originating from a partition within the peer network.

C1 In an example, a product includes: machine-readable media other than a transitory signal; instructions stored on the machine-readable media, the instructions configured to, when executed, cause a machine to: at network interface circuitry: access a blockchain via a peer network for the blockchain, the blockchain configured to: track: a custody status for a physical concession; and an authorization status for a receiving custodian of the physical concession; store a proof of authorization for the receiving custodian, the proof of authorization confirming an entitlement of the receiving custodian to obtain issue of the physical concession; and implement a consensus operating procedure by temporally ordering multiple status exchanges for the physical concession; at authorization circuitry: obtain an identifier for the physical concession via a scan of a machine-cognizable code presented on behalf of the receiving custodian; using the identifier and via the network interface circuitry, access the proof of authorization stored on the blockchain for the receiving custodian; and via the network interface circuitry, access the custody status for the physical concession; at a time that the custody status is unissued and the receiving custodian is authorized, cause an issuance display confirming issue of the physical concession to the receiving custodian is allowed; and at a time that the custody status is issued or the receiving custodian is unauthorized, cause an rejection display confirming issue to the receiving custodian is disallowed; and at tracking circuitry: responsive to causing the issuance display, send a custody change request to the peer network via the network interface circuitry, the custody change request configured to request, for addition to the blockchain, a record of a status exchange changing the custody status from unissued to issued.

C2 The product of example C1, where the proof of authorization is configured to confirm entitlement of the receiving custodian to multiple physical concessions.

C3 The product of example C2, where the multiple physical concessions include multiple instances of the same inventory item.

C4 The product of example C3, where the proof of authorization defines a schedule by which issuances of the multiple instances of the same inventory item are allowed.

D1 A method implemented by operation of a system of any of examples A1-A13.

E1 A product including instructions stored on a machine readable medium, the instructions configured to cause a machine to implement the method of example D1.

Various implementations have been specifically described. However, many other implementations are also possible.

What is claimed is:
1. A system including:
   network interface circuitry configured to:
     access a blockchain via a peer network for the blockchain,
       the blockchain configured to:
         track:
           a custody status for a physical concession; and
           an authorization status for a receiving custodian of the physical concession;
         store a proof of authorization for the receiving custodian, the proof of authorization confirming an entitlement of the receiving custodian to obtain issue of the physical concession, the proof of authorization including an identifier of the physical concession in an encrypted form to obscure the identity of the physical concession from non-stakeholder peers associated with the blockchain; and
         implement a consensus operating procedure by temporally ordering multiple status exchanges for the physical concession;
   authorization circuitry configured to:
     obtain an identifier for the physical concession via a scan of a machine-cognizable code presented on behalf of the receiving custodian;
     using the identifier and via the network interface circuitry, access the proof of authorization stored on the blockchain for the receiving custodian; and
     via the network interface circuitry, access the custody status for the physical concession;
     cause an issuance display,
       the issuance display confirming issue of the physical concession to the receiving custodian is allowed, and
       the issuance display caused at a time that the custody status is unissued and the receiving custodian is authorized; and
     cause a rejection display,
       the rejection display confirming issue to the receiving custodian is disallowed, and
       the rejection display caused at a time that the custody status is issued or the receiving custodian is unauthorized; and
   tracking circuitry configured to:
     responsive to causing the issuance display, send a custody change request to the peer network via the network interface circuitry, the custody change request configured to request, for addition to the blockchain, a record of a status exchange changing the custody status from unissued to issued.

2. The system of claim 1, the tracking circuitry is configured to, responsive to causing the rejection display, send an alert request to the peer network via the network interface circuitry, the alert request configured to request a record of a disallowed issuance on the blockchain.

3. The system of claim 1, where the authorization circuitry is configured to:
   before obtaining the identifier, generate the proof of authorization based on a captured authorizing document provided by the receiving custodian; and
   after generating the proof of authorization, send, to the peer network, an authorization storage request to store the proof of authorization on the blockchain.

4. The system of claim 1, where the machine-cognizable code includes a barcode, a QR code, an image, a two-dimensional symbol array, or any combination thereof.

5. The system of claim 1, where the issuance display includes an image, biometric data, or both to facilitate identification of the receiving custodian.

6. The system of claim 1, where the proof of authorization is received at the peer network from a licensed issuing authority.

7. The system of claim 6, where the proof of authorization is digitally signed using a private key assigned to the licensed issuing authority.

8. The system of claim 1, where the tracking circuitry is configured to attach a timestamp to the custody change request.

9. The system of claim 8, where the timestamp is configured to distinguish multiple separate custody change requests from multiple instances of a single change request originating from a partition within the peer network.

10. The system of claim 1, where the proof of authorization is stored within the blockchain in an encrypted form.

11. The system of claim 10, where the authorization circuitry is further configured to obtain a decryption key for the proof of authorization from the machine-cognizable code.

12. The system of claim 1, where the proof of authorization is configured to confirm entitlement of the receiving custodian to multiple physical concessions.

13. The system of claim 12, where the multiple physical concessions include multiple instances of the same inventory item.

14. The system of claim 13, where the proof of authorization defines a schedule by which issuances of the multiple instances of the same inventory item are allowed.

15. A method including:
   at network interface circuitry:
     accessing a blockchain via a peer network for the blockchain, the blockchain configured to:
track:
a custody status for a physical concession; and
an authorization status for a receiving custodian of the physical concession;
store a proof of authorization for the receiving custodian, the proof of authorization confirming an entitlement of the receiving custodian to obtain issue of the physical concession, the proof of authorization including an identifier of the physical concession in an encrypted form to obscure the identity of the physical concession from non-stakeholder peers associated with the blockchain; and
implement a consensus operating procedure by temporally ordering multiple status exchanges for the physical concession;

at authorization circuitry:
obtaining an identifier for the physical concession via a scan of a machine-cognizable code presented on behalf of the receiving custodian;
using the identifier and via the network interface circuitry, accessing the proof of authorization stored on the blockchain for the receiving custodian; and
via the network interface circuitry, accessing the custody status for the physical concession;
at a time that the custody status is unissued and the receiving custodian is authorized, causing an issuance display confirming issue of the physical concession to the receiving custodian is allowed; and
at a time that the custody status is issued or the receiving custodian is unauthorized, causing a rejection display confirming that issue, to the receiving custodian, of the physical concession in particular is disallowed; and at tracking circuitry:
responsive to causing the issuance display, sending a custody change request to the peer network via the network interface circuitry, the custody change request configured to request, for addition to the blockchain, a record of a status exchange changing the custody status from unissued to issued.

16. The method of claim 15, further including, at the tracking circuitry:
attaching a timestamp to the custody change request, the timestamp configured to distinguish multiple separate custody change requests from multiple instances of a single change request originating from a partition within the peer network.

17. A product including:
machine-readable media other than a transitory signal;
instructions stored on the machine-readable media, the instructions configured to, when executed, cause a machine to:

at network interface circuitry:
access a blockchain via a peer network for the blockchain,
the blockchain configured to:
track:
a custody status for a physical concession; and
an authorization status for a receiving custodian of the physical concession;
store a proof of authorization for the receiving custodian, the proof of authorization confirming an entitlement of the receiving custodian to obtain issue of the physical concession, the proof of authorization including an identifier of the physical concession in an encrypted form to obscure the identity of the physical concession from non-stakeholder peers associated with the blockchain; and
implement a consensus operating procedure by temporally ordering multiple status exchanges for the physical concession;

at authorization circuitry:
obtain an identifier for the physical concession via a scan of a machine-cognizable code presented on behalf of the receiving custodian;
using the identifier and via the network interface circuitry, access the proof of authorization stored on the blockchain for the receiving custodian; and
via the network interface circuitry, access the custody status for the physical concession;
at a time that the custody status is unissued and the receiving custodian is authorized, cause an issuance display confirming issue of the physical concession to the receiving custodian is allowed; and
at a time that the custody status is issued or the receiving custodian is unauthorized, cause a rejection display confirming issue of the physical concession to the receiving custodian is disallowed; and at tracking circuitry:
responsive to causing the issuance display, send a custody change request to the peer network via the network interface circuitry, the custody change request configured to request, for addition to the blockchain, a record of a status exchange changing the custody status from unissued to issued.

18. The product of claim 17, where the proof of authorization is configured to confirm entitlement of the receiving custodian to multiple physical concessions.

19. The product of claim 18, where the multiple physical concessions include multiple instances of the same inventory item.

20. The product of claim 19, where the proof of authorization defines a schedule by which issuances of the multiple instances of the same inventory item are allowed.

* * * * *